Patented June 12, 1923.

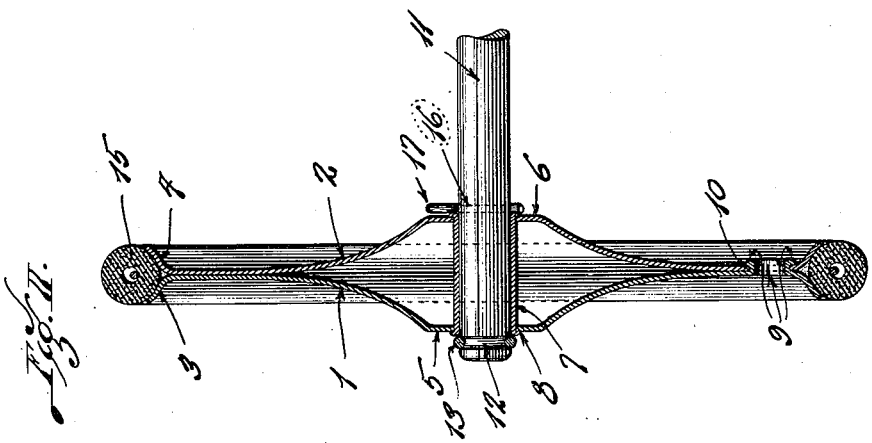
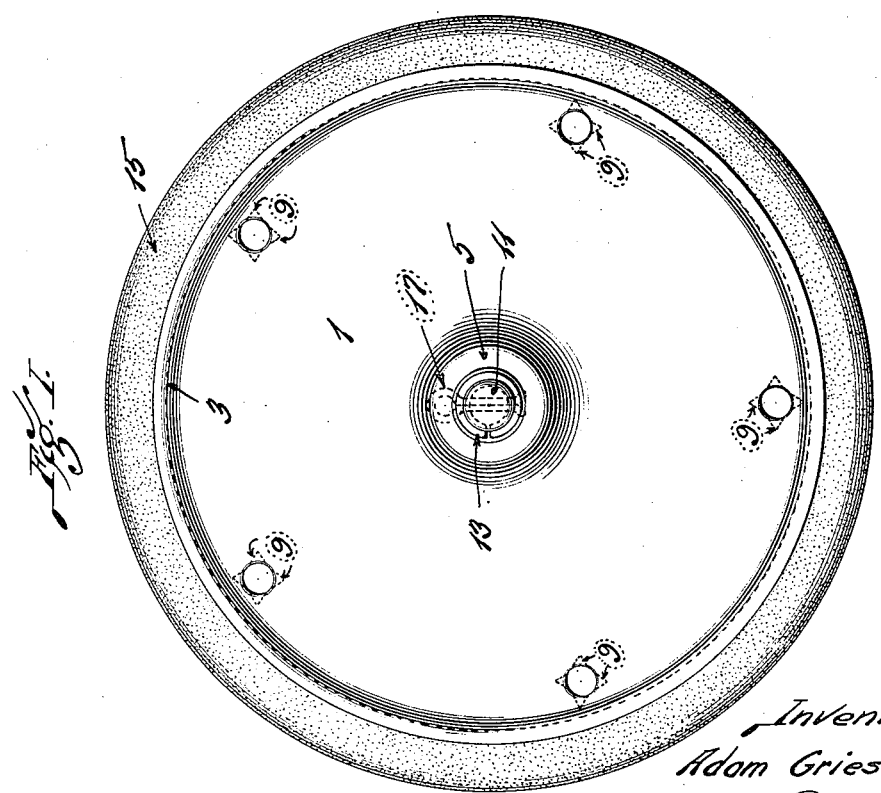

1,458,759

UNITED STATES PATENT OFFICE.

ADAM GRIESEMER, OF ST. LOUIS, MISSOURI, ASSIGNOR TO SIMPLEX STEEL STAMPING & MANUFACTURING COMPANY, OF ST. LOUIS, MISSOURI, A CORPORATION OF MISSOURI.

WHEEL.

Application filed April 19, 1920. Serial No. 375,081.

*To all whom it may concern:*

Be it known that I, ADAM GRIESEMER, a citizen of the United States of America, a resident of the city of St. Louis, in the State of Missouri, have invented certain new and useful Improvements in Wheels, of which the following is a full, clear, and exact description, reference being had to the accompanying drawings, forming a part of this specification.

My invention relates to improvements in wheels and has for its object to provide a retaining means for a wheel which can be applied without the use of nuts or bolts of any kind. With this object in view, I will proceed to a description of the drawings in which—

Fig. I is a side view of a wheel and axle, as seen from the outer axle end.

Fig. II is a vertical section taken through Fig. I.

1 and 2 designate annular stamped sheet metal discs. These discs have rim flanges 3 and 4 and hub flanges 5 and 6 integral therewith, the rim section being formed by an outer flange concavely bent so as to form a seat for a tire 15 when the two disc members are secured together. The hub sections 5 and 6 of the members 1 and 2 respectively are formed by flanging the inner member of the discs. The wheel is journaled upon an axle 11 by means of a sleeve 7 extending through apertures in the hubs 5 and 6 and bent over the outside of these hubs. The members 1 and 2 are secured together in a plane perpendicular to the journal axis. The member 2 is provided with a circumferential series of apertures 10 which are engaged by a corresponding circumferential series of interlocking prongs 9 formed upon the member 1. The member 1 is placed upon the member 2, and at points corresponding to the apertures 10, is punched through in the direction of the member 2 by which a plurality of prongs are driven into the apertures 10. These prongs are then bent back onto the member 2. The axle 11 is provided near its outer end with a peripheral groove 12 and is provided inwardly of this groove with a radial hole 16. The wheel is mounted upon the shaft and is prevented from lateral movement in either direction by means of a split ring 13 fitted into the peripheral groove 12 and projecting therefrom to engage the sleeve 7. A cotter key 17 is inserted through the hole 16 at the opposite end of the wheel. In assembling, the cotter key 17 would be first inserted and bent into place, then the wheel would be slipped over the axle and retained in place by means of the split ring 13 fitted into the groove 12. Since the ring is a single piece of material extending almost entirely around the axle it will retain itself in the groove 12, and no additional fastening means are required to secure the ring.

I claim:

1. In combination with an axle having a peripheral groove, a wheel rotatably mounted on said axle, and means to prevent lateral displacement of said wheel on said axle, said means comprising a split ring member seated in said groove and extending substantially around the axle, so as to retain itself in said groove, the outer margin of said ring member being extended from said groove to form an abutment for the wheel.

2. In combination with an axle having an annular peripheral groove, a wheel rotatably mounted on said axle, and means to prevent lateral displacement of said wheel on said axle, said means comprising a ring split transversely and made of a single piece of material seated in said groove and extending substantially around the axle, so as to retain itself in said groove, the outer margin of said ring being extended from said groove to form an abutment for the wheel.

In testimony that I claim the foregoing I hereunto affix my signature.

ADAM GRIESEMER.